(12) United States Patent
Harjunkoski et al.

(10) Patent No.: US 9,342,805 B2
(45) Date of Patent: May 17, 2016

(54) METHOD AND SYSTEM FOR GENERATING AN INTEGRATION MODEL

(71) Applicant: ABB AG, Mannheim (DE)

(72) Inventors: Iiro Harjunkoski, Weinheim (DE); Margret Bauer, Magdeburg (DE); Simo Saynevirta, Espoo (FI)

(73) Assignee: ABB AG, Mannheim (DE)

( * ) Notice: Subject to any disclaimer, the term of this patent is extended or adjusted under 35 U.S.C. 154(b) by 783 days.

(21) Appl. No.: 13/682,049

(22) Filed: Nov. 20, 2012

(65) Prior Publication Data
US 2013/0079896 A1 Mar. 28, 2013

Related U.S. Application Data

(63) Continuation of application No. PCT/EP2011/002571, filed on May 24, 2011.

(30) Foreign Application Priority Data

May 25, 2010 (DE) .......................... 10 2010 021 382

(51) Int. Cl.
G05B 11/01 (2006.01)
G06Q 10/06 (2012.01)
G06F 9/44 (2006.01)

(52) U.S. Cl.
CPC ................ *G06Q 10/06* (2013.01); *G05B 11/01* (2013.01); *G06F 8/10* (2013.01); *G06F 8/34* (2013.01)

(58) Field of Classification Search
CPC ............. G05B 11/01; G06F 8/34; G06F 8/10; G06F 17/30; G06Q 10/00; G06Q 10/06
See application file for complete search history.

(56) References Cited

U.S. PATENT DOCUMENTS

| | | | | |
|---|---|---|---|---|
| 7,162,534 B2* | 1/2007 | Schleiss | ............. | G05B 19/4185 700/78 |
| 8,069,071 B2* | 11/2011 | Kall | ....................... | G06Q 10/06 700/97 |
| 2003/0120509 A1* | 6/2003 | Bruch | .................... | G06Q 10/02 705/307 |
| 2003/0149608 A1* | 8/2003 | Kall | ....................... | G06Q 10/06 705/7.27 |
| 2003/0200130 A1* | 10/2003 | Kall | ....................... | G06Q 10/06 705/7.36 |
| 2008/0195576 A1* | 8/2008 | Sande | ............... | G06F 17/30566 |
| 2009/0077055 A1* | 3/2009 | Dillon | ................ | G05B 23/0272 |
| 2009/0077805 A1* | 3/2009 | Bachrach | ............. | B23K 26/367 29/890.033 |
| 2010/0076809 A1* | 3/2010 | Eryurek | ................. | G05B 15/02 702/182 |

* cited by examiner

*Primary Examiner* — Charles Kasenge
(74) *Attorney, Agent, or Firm* — Buchanan Ingersoll & Rooney PC

(57) ABSTRACT

Exemplary systems and methods are directed to automated performance of a plant process in a control system included in a production management system. The control system including a processor that is configured with integration model code for executing an integration model. The processor is configured to integrate various software systems by establishing a connection to an enterprise resource planning system and exchange information between the plant process and a business process such that production data are received from the processes substantially in real time and an updated status of a production order is received continuously. The integration model includes placeholders associated with variables for at least one of events, devices and plants, placeholders associated with functions to be executed, functionalities which link the variables and call up the functions, mappings of parameters between the software systems to be linked, and requests for loading information from one software system to another.

15 Claims, 7 Drawing Sheets

METHOD AND SYSTEM FOR GENERATING AN INTEGRATION MODEL

RELATED APPLICATIONS

This application is a bypass continuation under 35 U.S.C. §120 of International Application PCT/EP2011/002571 filed in Germany on May 24, 2011 designating the U.S., and which claims priority to German Application 10 2010 021 382.9 filed in German on May 25, 2010, the contents of which are hereby incorporated by reference in their entirety.

FIELD

The disclosure relates to a method and to a system for generating an integration model, including an integration model for linking various and/or various types of applications for reducing and avoiding interfaces with regard to a smoother and/or simplified data communication and/or a simplified data and/or information management.

BACKGROUND INFORMATION

A workflow can be described as a sequence of activities in an organization, an undertaking, a structure or, process.

A data processing or computer system can support the respective workflow, supply it with specified data or information and handle or carry it out in accordance with a specification deposited in a data processing or computer system or an algorithm provided for this purpose.

For this purpose, software systems and their components are used. These enable workflows to be defined and performed in that they control individual instances of the workflow in accordance with a preset or predetermined arrangement and provide or request data and applications specified for this purpose.

Known software systems and their components involve coordinating which feature and/or component processes what, when and how.

In this context, integration models are intended to help to achieve and ensure the optimum involvement of various software systems and their components in workflows.

In this context, linking various applications and/or types of applications enables and/or causes the number to be advantageously reduced and thus interfaces to be avoided with regard to smoother or simplified data communication and/or a simplified data and/or information management.

Exemplary embodiments of the present disclosure are directed to specifying a method and a system by means of which an integration model can be generated without problems and checked for its reliability.

SUMMARY

An exemplary system for the automatic performance of a plant process is disclosed, the system comprising: a control system (PCS/DCS) included in a production management system (CPM), the control system including a processor that is configured with integration model code for executing an integration model, wherein the processor is configured to integrate various software systems by establishing a connection to an enterprise resource planning system (ERP) and exchange information between the plant process and a business process such that production data are received from the processes substantially in real time and an updated status of a production order is received continuously, and wherein the integration model includes: placeholders associated with variables for at least one of events, devices and plants, placeholders associated with functions to be executed, functionalities which link the variables and call up the functions, mappings of parameters between the software systems to be linked, and requests for loading information from one software system to another.

An exemplary method for the automated performance of a plant process in a processor of a control system included in a production management system is disclosed, the method comprising: in the processor: executing integration model code of an integration model; and integrating various software systems through the integration model by establishing a connection of the control system to an enterprise resource planning system (ERP) and exchanging information between the plant process and a business process, wherein production data is received substantially in real time and an updated status of a production order is received continuously, wherein integrating the software systems includes: identifying variables for at least one of events, devices and plants; identifying functions to be executed; connecting the variables and calling the functions; mapping parameters between the software systems to be linked through the connected variables and called functions; and managing requests for loading information from one software system to another.

An exemplary computer readable medium for a method of automated performance of a plant process in a control system of a production management system is disclosed, the computer readable medium being encoded with program code, which when in communicable contact with a processor of the control system, causes the control system to execute the steps of: executing an integration model; and integrating various software systems through the integration model by establishing a connection of the control system to an enterprise resource planning system (ERP) and exchanging information between the plant process and a business process, wherein production data is received substantially in real time and an updated status of a production order is received continuously, wherein integrating the software systems includes: identifying variables for at least one of events, devices and plants; identifying functions to be executed; connecting the variables and calling the functions; mapping parameters between the software systems to be linked through the connected variables and called functions; and managing requests for loading information from one software system to another.

DETAILED DESCRIPTION

Figure 1:
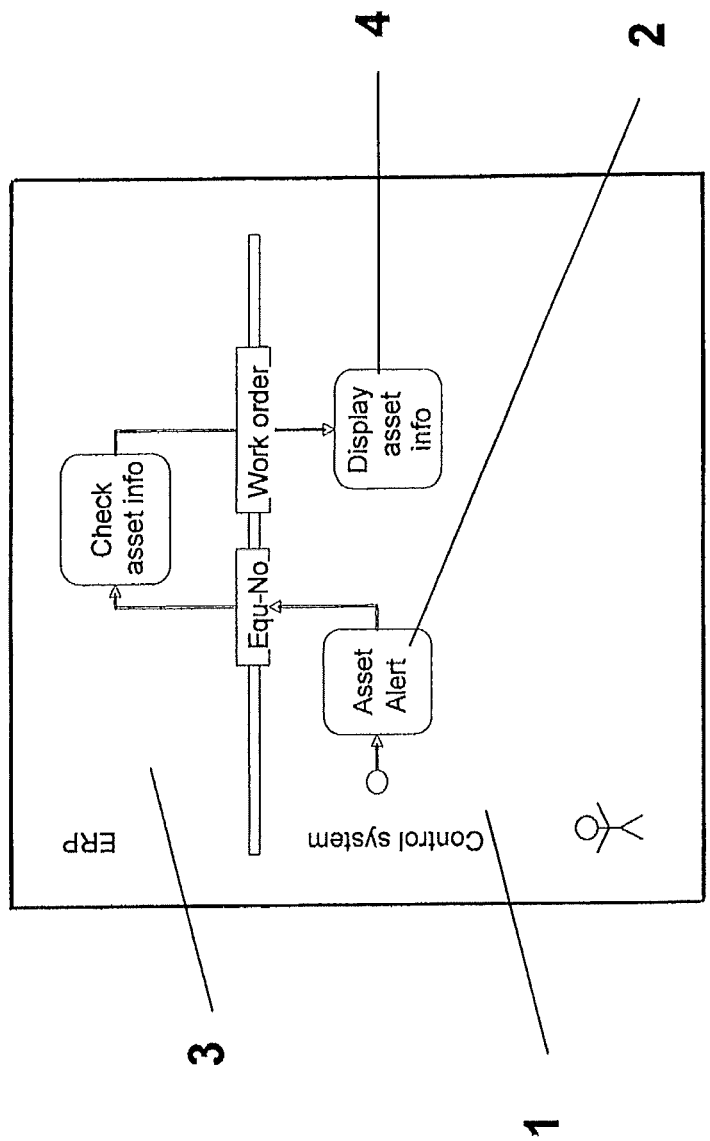
FIG. 1 shows a diagrammatic representation of a business process in an enterprise, wherein an asset alert is triggered in accordance with an exemplary embodiment of the present disclosure.

Exemplary embodiments of the present disclosure are directed to specifying a method and a system by means of which an integration model can be generated without problems and checked for its reliability.

According to the exemplary embodiments of the present disclosure are directed to a method and a corresponding system for generating an integration model.

According to an exemplary method of the present disclosure, the subsequent steps can be performed on a graphical user interface, for example, based on a graphical representation of a workflow, determining the software systems and/or applications to be integrated and/or to be linked, determining placeholders for variables for events and/or devices and/or plants and/or device or plant components, determining placeholders for executable functions, determining placeholders for functionalities, configuring the determined software systems to be integrated and their components, selecting object types and parameters, representing the parameters, generating an integration model code and checking the integration model code by means of simulation.

According to an exemplary embodiment of the present disclosure, the method allows an integration model to be generated, for example, from a graphically designed description of a workflow. The integration model then provides for executing a process without problems.

The checking of the integration model and/or of the associated integration model code is advantageously performed incrementally by simulation after a "check model" button has been pushed or activated and/or a corresponding functional area has been activated for model testing. By this means, an automated checking of the integration model generated or of its integration model code, respectively, is made possible and can be effected.

Furthermore, the object set is achieved also by a corresponding system for generating an integration model.

In this respect, the system includes at least one data processing unit (e.g., processor) and one display unit and means for graphically representing at least one workflow, wherein at least one generating unit for generating an integration model on the basis of a graphical representation of the respective workflow is provided, and means are provided by means of which, on a graphical user interface, a determination of the software systems and/or applications to be integrated and/or to be linked, determination of placeholders for variables for events and/or devices and/or plants and/or device or plant components, determination of placeholders for executable functions, determination of placeholders for functionalities, configuration of the determined software systems to be integrated and their components, selection of object types and parameters, representation of the parameters, and generation of an integration model code and checking of the integration model code by means of simulation can be performed and/or effected.

Furthermore, exemplary embodiments of the present disclosure provide for checking the integration model and/or the associated integration model code is executed incrementally by simulation, for example, after a corresponding functional area or button has been activated for model testing.

In another exemplary embodiment disclosed herein, means can be provided by means of which an automated checking of the integration model generated and/or of its integration model code can be performed and/or effected.

The system thus allows an integration model to be generated from a graphically designed description of a workflow. In this context, the integration model provides, for example, for executing a process without problems.

The checking of the integration model and/or of the associated integration model code by simulation can be advantageously effected incrementally after, for example, a "check model" button provided in advantageous development has been pushed or activated, respectively, and/or a corresponding functional area or button has been activated for model testing. By this means, an automated checking of the integration model generated or of its integration model code, respectively, is made possible and can be effected.

In another exemplary embodiment of the present disclosure, a computer program for execution on a correspondingly arranged data processing device (e.g., processor) has the features of an exemplary method disclosed herein whose process steps establish an exemplary embodiment of the system according to the disclosure. According to another exemplary embodiment disclosed herein a computer program stored on a computer readable medium, has the features of the exemplary method according to the present disclosure.

In an exemplary embodiment, a method of the present disclosure can be implemented in the 800xA/ECS (Enterprise Connectivity Solutions) system by ABB wherein the automated method facilitates the performance of a process or workflow, such as a plant and/or business process by means of a graphical modeling environment. This correspondingly applies analogously also to the corresponding system.

The ECS (Enterprise Connectivity Solutions) system, such as a software system, for example, establishes a connection between product solutions such as the industrial IT system 800xA by ABB and control systems of other manufacturers, other production management systems (CPM) and enterprise resource planning systems (ERP), such as SAP, Oracle or Microsoft. In addition, database systems and/or OPC-compliant systems and/or internet-capable systems can be integrated.

The ECS (Enterprise Connectivity Solutions) system accelerates the exchange of information between plant and business processes so that customers can achieve the flexibility and quality of delivery relied upon by them to remain competitive. Production data are provided almost in real-time and supply the continuously updated status of a production order. This provides for precise planning of the production and of the customer orders.

The further representation of the disclosure and advantageous embodiments and developments is carried out by means of some figures and exemplary embodiments.

FIG. 1 shows a diagrammatic representation of a business process in an enterprise, wherein an asset alert is triggered in accordance with an exemplary embodiment of the present disclosure. As shown in FIG. 1, it is shown that a control system (PCS/DCS) 1 has triggered an asset alert 2 relating to the asset of an item of production goods.

The asset alert 2 is generated by an asset management system (AM). Following this, information which relates to the asset and existing work orders is requested from an enterprise resource planning system (ERP) 3 and displayed in a user interface 4 of the control system (PCS/DCS) 1.

The control system (PCS/DCS) 1 and the enterprise resource planning system (ERP) 3 are in each case software systems.

The enterprise resource planning system (ERP) 3 of an enterprise includes, among other things, a business planning system (BP), a plant maintenance system (CMMS), a material management system (MM) and a laboratory management and laboratory information system (LIMS).

The said systems are components of the enterprise resource planning system (ERP) 3.

The control system (PCS/DCS) 1 is a component of a production management system (CPM) which includes an asset management system (AM), a planning system (P&S), a quality management system (QM), a process information management system (PIMS) and possibly a laboratory management and laboratory information system (LIMS) as further components.

Figure 2:
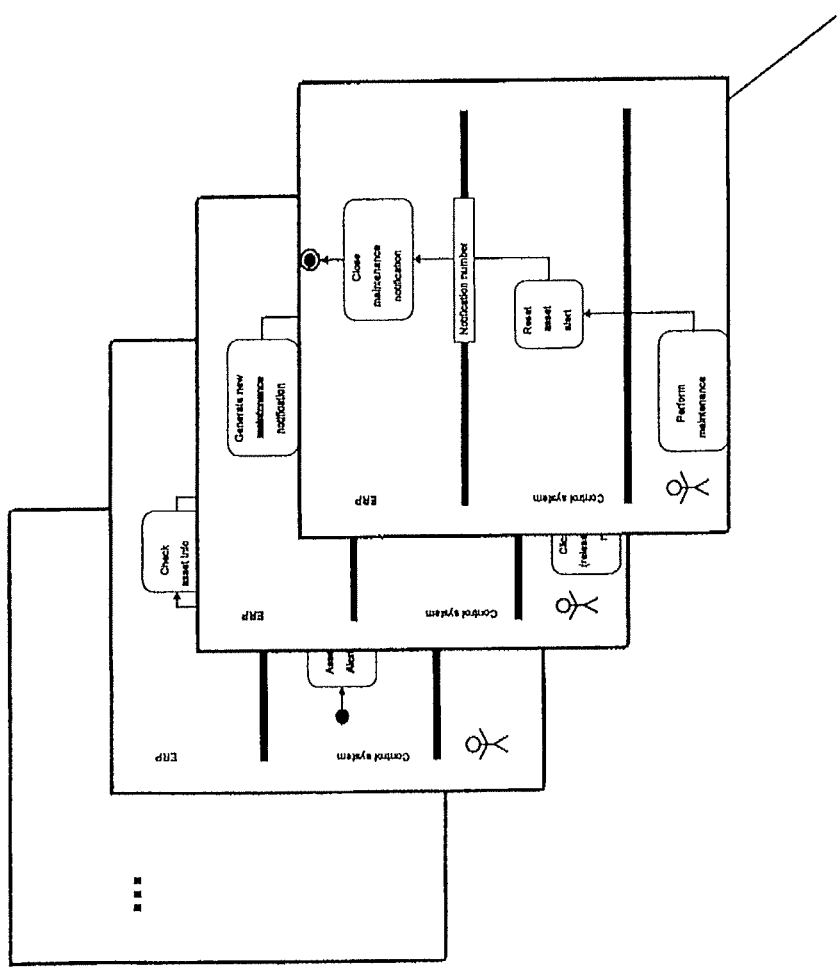
FIG. 2 shows a diagrammatic representation of the execution of the description of plural business processes entire scenario in accordance with an exemplary embodiment of the present disclosure.

FIG. 2 shows a diagrammatic representation of the execution of the description of plural business processes entire scenario in accordance with an exemplary embodiment of the present disclosure. FIG. 2 shows the step of describing the scenario for performing the method.

The scenario is displayed graphically. In this context, there are some predefined templates and/or outlines 5 which, for example, determine which software systems are involved. For example, a control system (PCS/DCS) 1, an asset management system (AM), a computer-controlled plant maintenance system (CMMS) and a user system (USER) are included.

Following this, placeholders for variables are determined which are used in the scenario. These variables are generic and are not provided with a property.

The variables include, for example, a number of the work orders (WO 1), a number of the plants (EN 1), a number of the asset alerts (AM 1) and a number of the user interfaces (DV 1).

Following this step, placeholders are determined for functions to be executed. The functions include, for example, the function of inquiring for data (F1).

Following this, functionalities are determined which link the variables and call up the functions. Functionalities include, for example, triggering rules. In this context, a triggering rule specifies that the function (F1) is executed when the number of asset alerts (AM 1) is greater than zero.

The functionalities also include allocations. The allocations specify, for example, that the number of user interfaces (DV 1) is equal to the number of work orders (WO 1).

New templates 5 of the scenario can be generated during this step. For this purpose, a graphics editor provides blocks for systems, variables and functions and functionalities.

Figure 3:
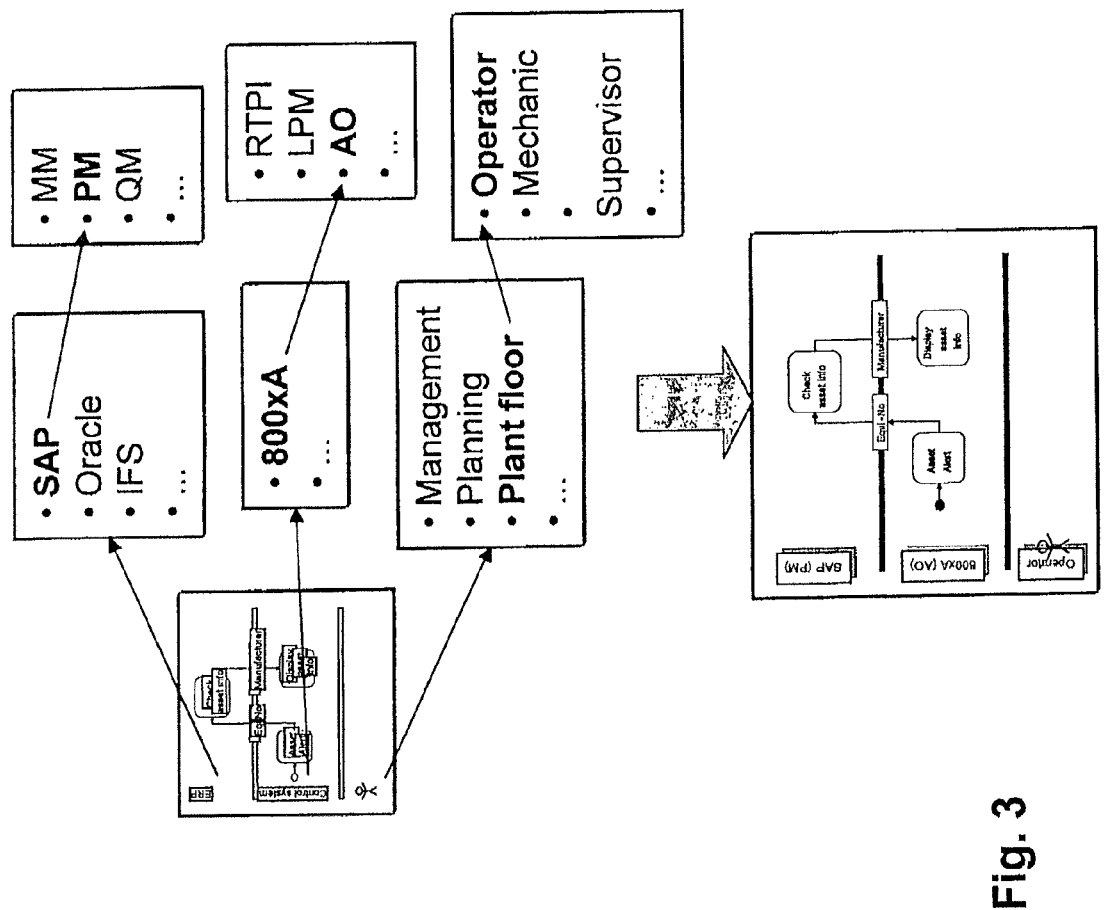
FIG. 3 shows a diagrammatic representation of a process of determining the software systems and their components in accordance with an exemplary embodiment of the present disclosure.

FIG. 3 shows a diagrammatic representation of a process of determining the software systems and their components in accordance with an exemplary embodiment of the present disclosure.

The current software systems to be integrated must be selected and configured. This is done by means of a graphical user interface on which the software systems and their components are selected and positioned.

As software system, the enterprise resource planning system (ERP) 3, such as the plant maintenance system (CMMS) component is selected which communicates with a software system of SAP which has the component (PM). The PM component relates to plant maintenance.

Furthermore, the control system (PCS/DCS) 1, for example, the asset management system (AM) component, is selected which communicates with the 800xA system. The 800xA system has here the AO component.

Finally, the user system (USER) is selected which communicates with the PLANT FLOOR software system. The PLANT FLOOR software system has the operator component.

These software systems and components are then specified further in dependence on their structure. For example, a single component of a software system can be the only specified one. For example, the PM component which relates to plant maintenance can be the specified component.

Figure 4:
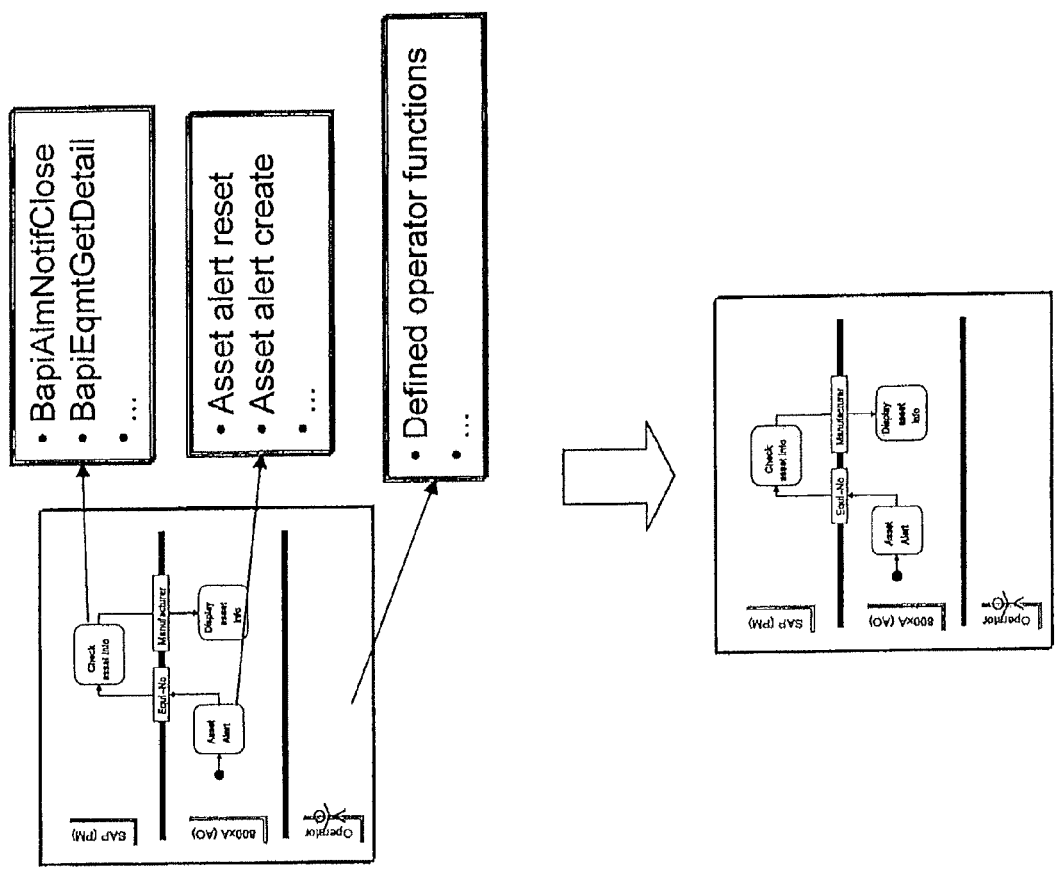
FIG. 4 shows a diagrammatic representation of a process of selecting object types and parameters in accordance with an exemplary embodiment of the present disclosure.

FIG. 4 shows a diagrammatic representation of a process of selecting object types and parameters in accordance with an exemplary embodiment of the present disclosure.

After the specification of the software systems and their components, the parameters are selected which describe the scenario.

In order to carry this out, all relevant parameters should be recognized. For example, SAP-BAPI designations and interfaces should be recognized. BAPIs are Business Application Programming Interfaces (BAPIs) which represent visible interfaces at component boundaries and provide for the integration of these components due to their properties. The integration can include both components within a local network and components which are connected to one another via the Internet. BAPIs provide for an integration at the business management level. This ensures greater stability of the coupling and an independence of the communication technology used.

Since all relevant and detailed variables and parameters are to be identified for all integrated software systems, the step described here should be performed possibly with greater effort.

Figure 5:
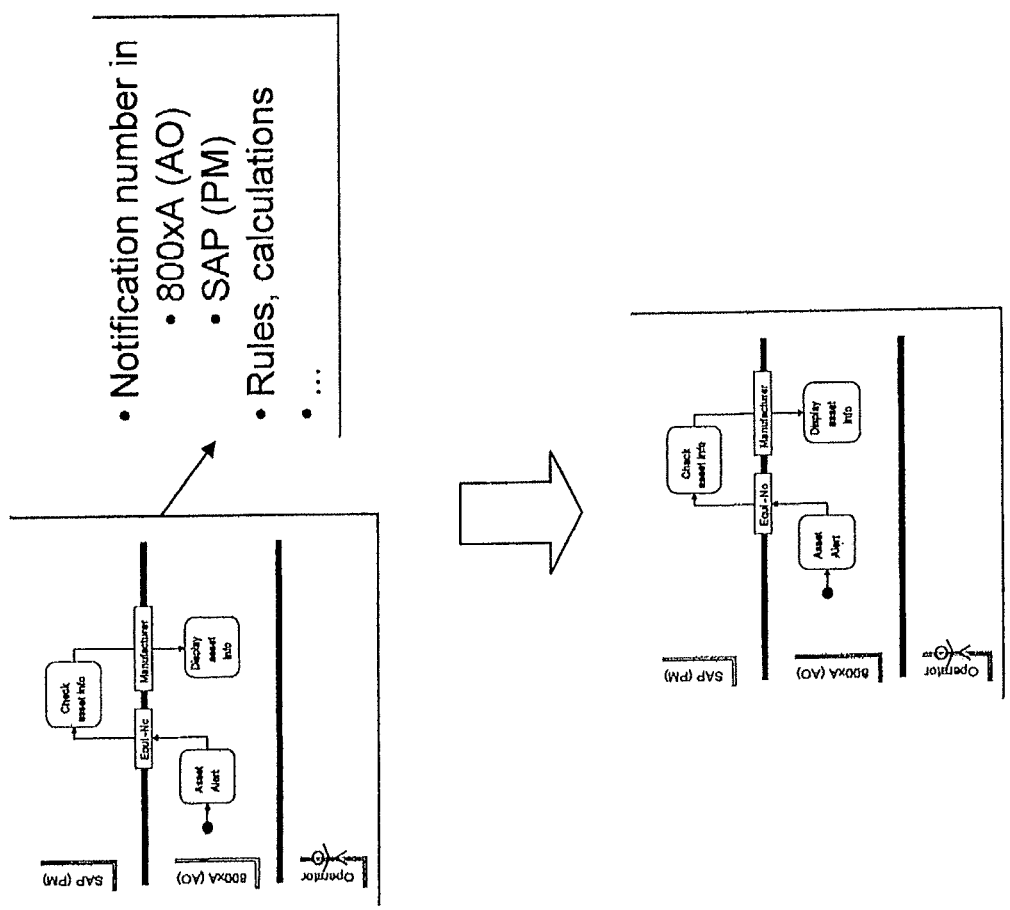
FIG. 5 shows a diagrammatic representation of a process of mapping the parameters in accordance with an exemplary embodiment of the present disclosure.

FIG. 5 shows a diagrammatic representation of a process of mapping the parameters in accordance with an exemplary embodiment of the present disclosure.

The mapping of the parameters between the software systems can include a simple "one-to-one mapping" or some computing steps or transformations, respectively. The mapping can also be done in a "business logic mode".

Requests can be used for loading information from one software system to another. These are also well defined transactions which have specified input/output interfaces and parameters. Finally, the triggering rules should be clearly presented. It should be clear what triggers which activity.

Figure 6:
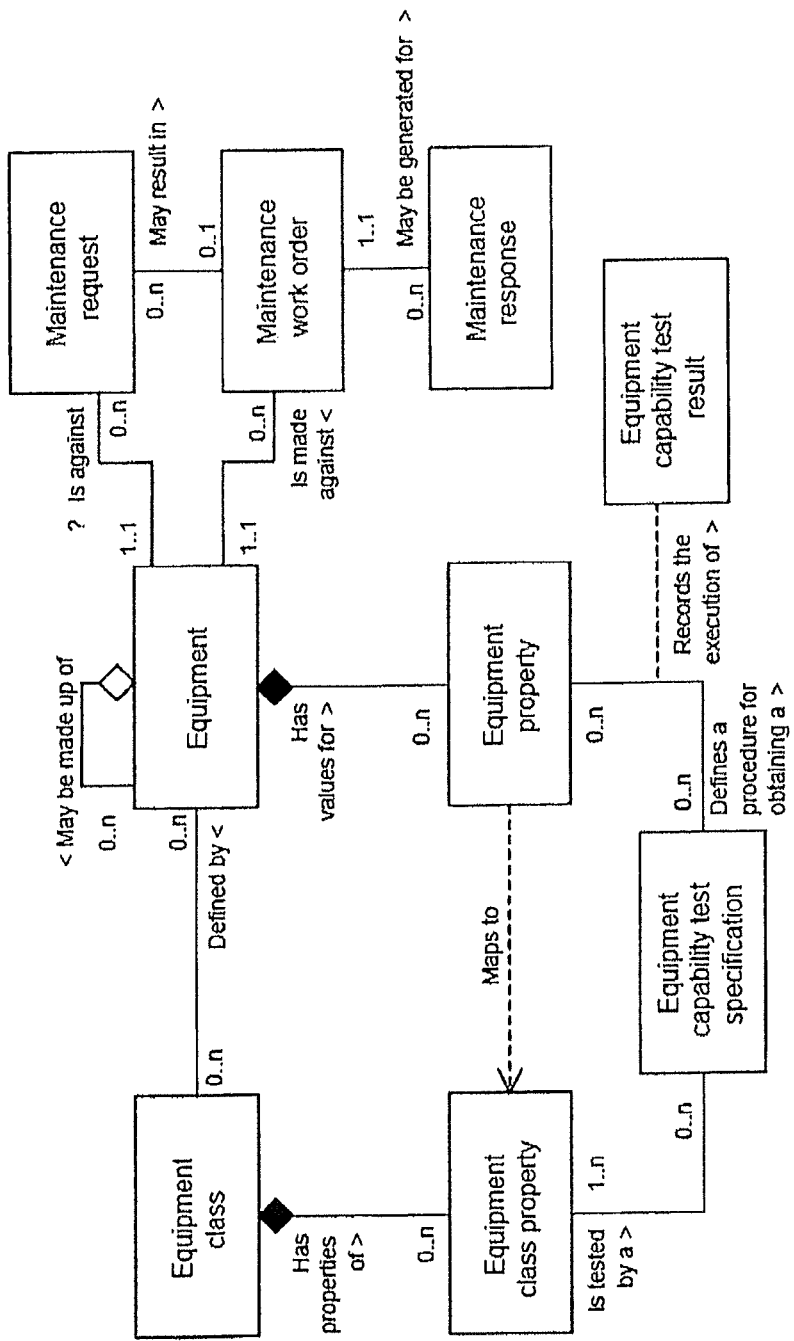
FIG. 6 shows a diagrammatic representation of a process of generating the integration model code in accordance with an exemplary embodiment of the present disclosure.

FIG. 6 shows a diagrammatic representation of a process of generating the integration model code in accordance with an exemplary embodiment of the present disclosure.

The integration model is now complete inasmuch as that all information is given. To execute the integration model, for example, by use on the control system (PCS/DCS) 1, an integration model code must be generated. The integration model code ensures compatibility with the ISA 95 standard. The data structure and data terminology is shown in FIG. 6. The integration model code has the .XML format.

Figure 7:
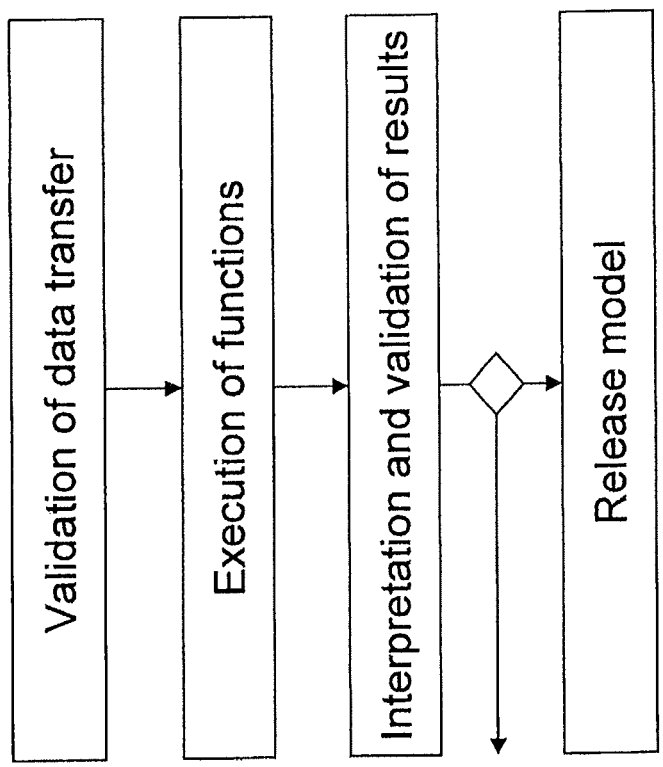
FIG. 7 shows a diagrammatic representation of a process of checking the integration model by step-by-step simulation in accordance with an exemplary embodiment of the present disclosure.

FIG. 7 shows a diagrammatic representation of a process of checking the integration model by step-by-step simulation in accordance with an exemplary embodiment of the present disclosure.

In this step, the following actions are carried out automatically by pushing a "check model" button. Data transfers and the exchange of information between two software systems are tested and checked for their correct sequence. For example, it is checked whether a data type is correct and can be understood by the software system to which a variable has been transmitted. The functions are executed in succession. The results of the execution are interpreted and confirmed.

The integration model is released after having been successfully tested.

In this context, the present disclosure also includes arbitrary combinations of exemplary embodiments and of individual design features or developments unless these are mutually exclusive.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE DESIGNATIONS

1 Control system (PCS/DCS)
2 Asset alert
3 Enterprise resource planning system (ERP)
4 User interface of the control system (PCS/DCS)
5 Template

What is claimed is:

1. A system for the automatic performance of a plant process comprising:
a control system (PCS/DCS) included in a production management system (CPM), the control system including a processor that is configured with integration model code for executing an integration model,
wherein the processor is configured to integrate various software systems by establishing a connection to an enterprise resource planning system (ERP) and exchange information between the plant process and a business process such that production data are received from the processes substantially in real time and an updated status of a production order is received continuously, and
wherein the integration model includes:
placeholders associated with variables for at least one of events, devices and plants,
placeholders associated with functions to be executed,
functionalities which link the variables and call up the functions,
mappings of parameters between the software systems to be linked, and
requests for loading information from one software system to another,
wherein the variables include a number of work orders (WO1), a number of plants (EN1), a number of asset alerts (AM1), and a number of user interfaces (DV1).

2. The system as claimed in claim 1, wherein an asset management system (AM) of the production management system (CPM), a computer-controlled plant maintenance system (CMMS) of the enterprise resource planning system (ERP), and a user system (USER) are linked as software systems to the control system (PCS/DCS).

3. The system as claimed in claim 2, wherein the control system is configured to (PCS/DCS) trigger an asset alert relating to an asset of an item of production goods, the asset alert is generated by the asset management system (AM), information relating to the asset and existing work orders are requested from the enterprise resource planning system (ERP) and the information is displayed in a user interface (4) of the control system (PCS/DCS).

4. The system as claimed in claim 1, wherein the processor is configured to execute at least one function that includes requesting data (F1).

5. The system as claimed in claim 1, wherein the processor is configured to analyze triggering rules of the functionalities.

6. The system as claimed in claim 4, wherein the processor is configured to execute at least one function requesting data when a number of asset alerts (AM1) is greater than zero.

7. The system as claimed in claim 5, wherein one of the triggering rules specifies that a function (F1) is executed when the number of asset alerts (AM1) is greater than zero.

8. The system as claimed in claim 1, wherein the processor is configured to allocate data based on the functionalities.

9. The system as claimed in claim 8, wherein allocations specify that a number of user interfaces (DV1) is equal to a number of work orders (WO1).

10. The system as claimed in claim 8, wherein the allocations specify that a number of user interfaces (DV1) is equal to a number of work orders (WO1).

11. The system as claimed in claim 1, wherein the processor is configured to allocate data based on the functionalities.

12. The system as claimed in claim 11, wherein allocations specify that a number of user interfaces (DV1) is equal to a number of work orders (WO1).

13. The system as claimed in claim 11, wherein allocations specify that a number of user interfaces (DV1) is equal to a number of work orders (WO1).

14. The system as claimed in claim 1, wherein based on the mappings of the parameters the processor is configured to execute a simple one-to-one mapping of data or perform data transformations.

15. The system as claimed in claim 1, wherein the processor is configured to execute requests for loading information by specifying input/output interfaces and parameters.

* * * * *